US010212386B2

(12) United States Patent
Liu et al.

(10) Patent No.: US 10,212,386 B2
(45) Date of Patent: Feb. 19, 2019

(54) METHOD, DEVICE, TERMINAL DEVICE, AND STORAGE MEDIUM FOR VIDEO EFFECT PROCESSING

(71) Applicant: Xiaomi Inc., Beijing (CN)

(72) Inventors: Jie Liu, Beijing (CN); Xiaoyong Wu, Beijing (CN); Wei Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/158,276

(22) Filed: May 18, 2016

(65) Prior Publication Data
US 2017/0064245 A1    Mar. 2, 2017

(30) Foreign Application Priority Data

Aug. 28, 2015 (CN) .......................... 2015 1 0541656

(51) Int. Cl.
| H04N 5/783 | (2006.01) |
| G11B 27/00 | (2006.01) |
| G11B 27/034 | (2006.01) |
| G11B 27/28 | (2006.01) |
| G11B 27/34 | (2006.01) |
| G06T 7/246 | (2017.01) |

(52) U.S. Cl.
CPC ............ *H04N 5/783* (2013.01); *G06T 7/246* (2017.01); *G11B 27/005* (2013.01); *G11B 27/034* (2013.01); *G11B 27/28* (2013.01); *G11B 27/34* (2013.01); *G06T 2207/10016* (2013.01)

(58) Field of Classification Search
USPC ................................................ 386/343–352
See application file for complete search history.

(56) References Cited

U.S. PATENT DOCUMENTS

| 7,003,154 B1 | 2/2006 | Peker et al. |
| 7,177,532 B2 | 2/2007 | Roman et al. |
| 7,720,349 B2 | 5/2010 | Ogikubo |
| 8,358,373 B2 | 1/2013 | Yamamoto et al. |
| 2002/0051081 A1* | 5/2002 | Hori ...................... G11B 27/005 348/553 |
| 2004/0227817 A1* | 11/2004 | Oya ........................ G06F 3/017 348/155 |

(Continued)

FOREIGN PATENT DOCUMENTS

| CN | 101075949 A | 11/2007 |
| CN | 101448092 A | 6/2009 |

(Continued)

OTHER PUBLICATIONS

International Search Report of PCT Application No. PCT/CN2015/099729, dated May 16, 2016, issued by the State Intellectual Property Office of P.R. China as ISA (4 pages).

(Continued)

*Primary Examiner* — Hung Q Dang
(74) *Attorney, Agent, or Firm* — Finnegan, Henderson, Farabow, Garrett & Dunner LLP

(57) ABSTRACT

A method for video effect processing includes receiving a video effect processing instruction associated with a video, performing a movement amount detection on each of a plurality of video frames of the video to determine target video frames that require the video effect processing, and performing the video effect processing on the target video frames during playback of the video.

9 Claims, 12 Drawing Sheets

(56) References Cited

U.S. PATENT DOCUMENTS

| | | | |
|---|---|---|---|
| 2005/0155072 A1* | 7/2005 | Kaczowka | G11B 27/005 725/95 |
| 2009/0144785 A1 | 6/2009 | Walker et al. | |
| 2010/0091111 A1 | 4/2010 | Kang | |
| 2010/0092151 A1* | 4/2010 | Miyakoshi | H04N 5/145 386/343 |
| 2010/0321566 A1 | 12/2010 | Yamamoto et al. | |
| 2011/0176740 A1* | 7/2011 | Teo | H04N 19/139 382/236 |
| 2013/0011123 A1 | 1/2013 | Jia | |
| 2015/0221335 A1 | 8/2015 | Licata | |

FOREIGN PATENT DOCUMENTS

| | | | |
|---|---|---|---|
| CN | 101600107 A | | 9/2009 |
| CN | 101573972 A | | 11/2009 |
| CN | 102065320 A | | 5/2011 |
| CN | 104080006 A | | 10/2014 |
| CN | 105120337 A | | 12/2015 |
| EP | 0 758 832 A2 | | 2/1997 |
| EP | 1 331 816 A1 | | 7/2003 |
| JP | 2004248089 A | | 9/2004 |
| KR | 20040035139 A | | 4/2004 |
| KR | 20050023090 A | | 3/2005 |
| KR | 101366150 B1 | | 2/2014 |
| RU | 2345500 C2 | | 1/2009 |
| RU | 2013111845 A | | 10/2014 |
| WO | WO 01/13641 A1 | | 2/2001 |
| WO | WO 01/63920 A1 | | 8/2001 |
| WO | WO 2013/113985 A1 | | 8/2013 |

OTHER PUBLICATIONS

Office Action dated May 12, 2017, in counterpart Russian Application No. 2016114551/08(022918) and English translation thereof.
English version of International Search Report of PCT Application No. PCT/CN2015/099729, dated May 16, 2016, issued by the ISA/CN—State Intellectual Property Office of the P.R. China.
Extended Search Report for European Application No. 16175108.6 from the European Patent Office, dated Oct. 4, 2016.
YouTube—"*Slow Motion Videos and Fast Forward Videos*," available at https://www.youtube.com/watch?v=eruX0zMr3rE, May 15, 2015.
M. Mullarkey, et al., "*To Grow or Not to Grow, That is Slopro*", Informing Science Institute—Journal of Information Technology Education: Discussion Cases—vol. 3, Case No. 6, Sep. 5, 2014.
S-H, Choi et al., "*Frame Interpolation using Dominant MV*", Kwangwoon University Computer Engineering, 2009.

* cited by examiner

METHOD, DEVICE, TERMINAL DEVICE, AND STORAGE MEDIUM FOR VIDEO EFFECT PROCESSING

CROSS-REFERENCE TO RELATED APPLICATIONS

This application is based upon and claims priority to Chinese Patent Application 201510541656.9, filed on Aug. 28, 2015, the entire contents of which are incorporated herein by reference.

TECHNICAL FIELD

The present disclosure relates to video processing and, more particularly, to a method, device, terminal device, and storage medium for video effect processing.

BACKGROUND

In conventional technologies, in order to add a video effect, such as fast forward or slow motion, to a video in a terminal device, a user needs to install video editing software on the terminal device, perform effect processing operations on the video using the video edit software, and then save a new copy of the video. Then, the user can play the copy on the terminal device to watch the video with the video effect, such as fast forward or slow motion.

SUMMARY

In accordance with the present disclosure, there is provided a method for video effect processing. The method includes receiving a video effect processing instruction associated with a video, performing a movement amount detection on each of a plurality of video frames of the video to determine target video frames that require the video effect processing, and performing the video effect processing on the target video frames during playback of the video.

In accordance with the present disclosure, there is also provided a terminal device including a processor and a memory storing instructions. The instructions, when executed by the processor, cause the processor to receive a video effect processing instruction associated with a video, perform a movement amount detection on each of a plurality of video frames of the video to determine target video frames that require the video effect processing, and perform the video effect processing on the target video frames during playback of the video.

In accordance with the present disclosure, there is also provided a non-transitory computer-readable storage medium storing instructions that, when executed by a processor in a terminal, cause the terminal to receive a video effect processing instruction associated with a video, perform a movement amount detection on each of a plurality of video frames of the video to determine target video frames that require the video effect processing, and perform the video effect processing on the target video frames during playback of the video.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the invention as recited in the appended claims.

A method for video effect processing consistent with the present disclosure can be implemented, for example, in a terminal device such as a smart phone, a computer, a tablet device, a Personal Digital Assistant (PDA), or the like, and more specifically, can be performed by a component with processing function, such as a Central Processing Unit (CPU), in the terminal device.

Figure 1:
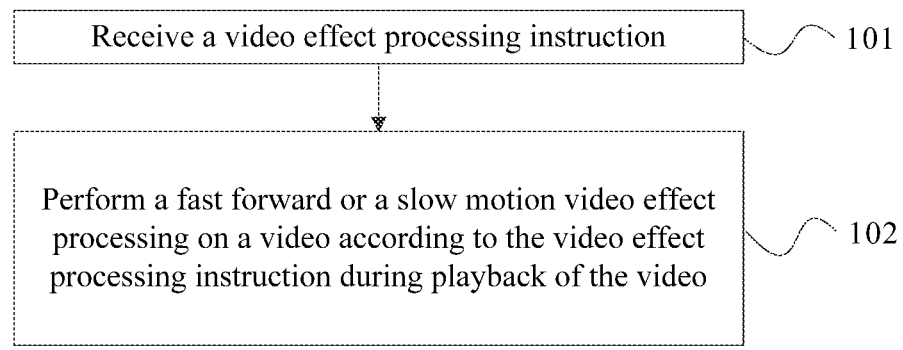
FIG. 1 is a flow chart showing a method for video effect processing according to an exemplary embodiment.

FIG. 1 is a flow chart of a method for video effect processing according to an exemplary embodiment. As illustrated in FIG. 1, at 101, a video effect processing instruction is received. Sometimes, while watching a video on the terminal device, the user may wish to add video effects to the video. For example, for a video showing a rabbit running on grass, if a slow motion effect is added to the part showing the rabbit running, movement of the running rabbit can be clearly seen, such that the user watching the video may have a feeling of enjoying a blockbuster movie. As another example, in a surveillance video, a large portion may be merely a still picture that does not change for a long time. The user watching the surveillance video may wish to fast forward the surveillance video to reduce the time for watching the video. According to the present disclosure, a fast forward or a slow motion video effect can be performed directly while the video is played. Generally, the terminal device decodes and plays the video under a normal speed. If the user wishes to add a video effect of fast forward or slow motion on the video, the user can turn on a video effect processing function before playing the video, or input a video effect processing instruction to the terminal interactively while the video is being played. The video effect processing instruction generated by such operations can trigger the terminal device to perform a video effect processing on the video.

At 102, during playback of the video, a fast forward or a slow motion video effect processing is performed on the video according to the video effect processing instruction. That is, when being triggered by the video effect processing instruction, the terminal device initiates the fast forward or the slow motion video effect processing on the video. At the same time, the terminal device can also acquire instruction information on performing the video effect processing on the video according to the video effect processing instruction. For example, the user can generate the video effect processing instruction by clicking a preset video effect processing button, which can be a virtual button on a touch screen of the terminal device, or a physical button of the terminal device. In some embodiments, the terminal device can include two special buttons for fast forward or slow motion, respectively. In some embodiments, the terminal device can include only one special button and the video effect processing instruction can be generated by various clicking operations, such as a single click and a double click.

Figure 2:
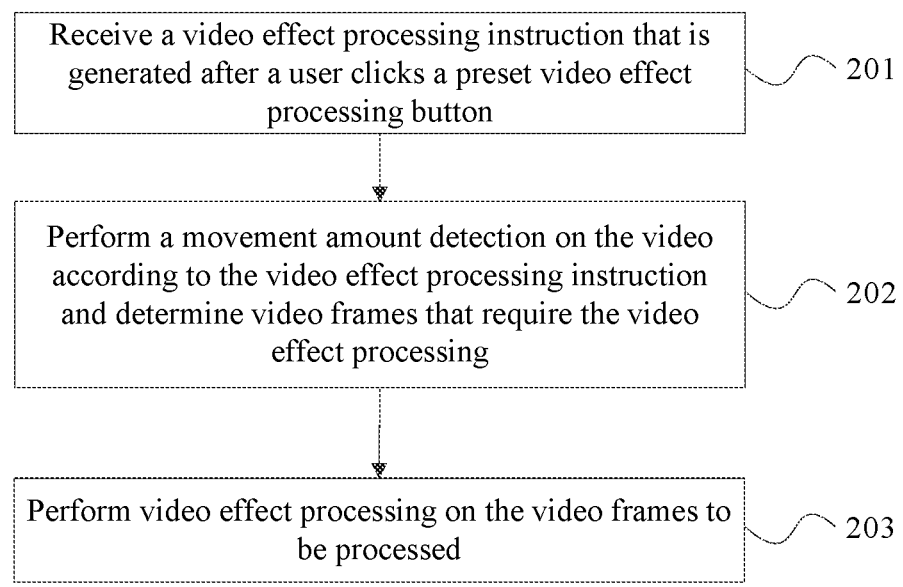
FIG. 2 is a flow chart showing a method for video effect processing according to another exemplary embodiment.
Figure 3:
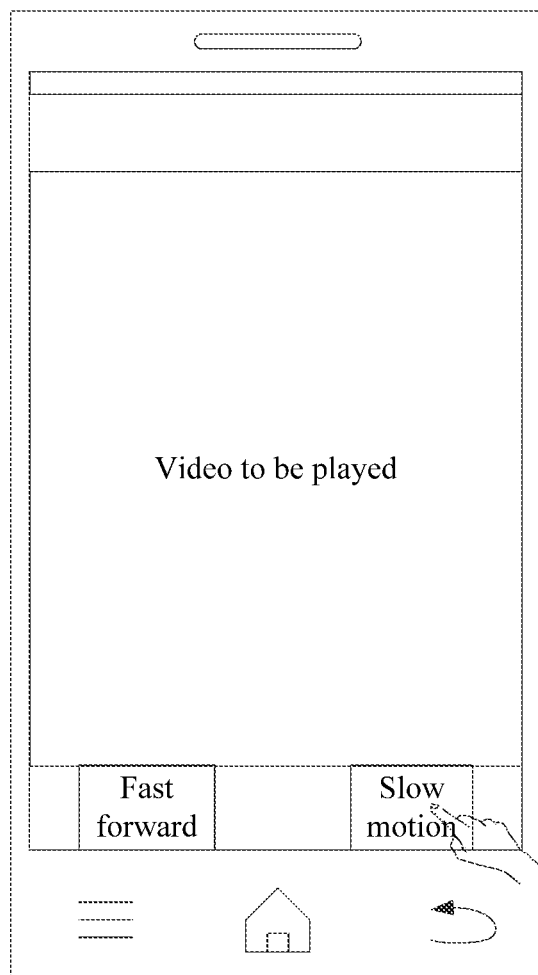
FIG. 3 is a schematic diagram showing a user clicking a video effect processing button.

FIG. 2 is a flow chart of a method for video effect processing according to another exemplary embodiment. As illustrated in FIG. 2, at 201, a video effect processing instruction is received. The video effect processing instruction is generated after a user clicks a preset video effect processing button, which is configured to trigger a video effect processing on a video to be played, such as the fast forward or slow motion video effect processing. For example, the user can click on the preset video effect processing button before playing the video to generate a slow motion video effect processing instruction that triggers the terminal device to perform the slow motion video effect processing while playing the video. The preset video effect processing button can be a virtual button on the touch screen of the terminal device or a physical button of the terminal device. The preset video effect processing button can be one of two special buttons for fast forward and slow motion, respectively, or can be a special button configured to generate different video effect processing instructions for fast forward and slow motion by different clicking operations such as single click and double click. FIG. 3 is a schematic diagram showing the user clicking the video effect processing button. As illustrated in FIG. 3, the buttons for fast forward and slow motion are provided on an interface for playing the video on the terminal device.

At 202, a movement amount detection is performed on the video according to the video effect processing instruction and video frames that require the video effect processing are determined.

The terminal device can perform the movement amount detection automatically on the video during the playback of the video according to the above video effect processing instruction. The video includes a plurality of video frames, which may be processed differently according to the present disclosure. For example, for video frames containing fast movement, which are also referred to herein as "fast movement frames," the slow motion video effect processing can be performed such that the user can more clearly see the movement or can be performed to realize a slowing-down effect of the fast movement. On the other hand, for video frames containing slow movement or including still or close-to-still images, which are also referred to herein as "slow movement frames," the fast forward video effect processing can be performed to shorten the watching time or to prevent the user from being impatient. In some embodiments, the terminal device can perform the movement amount detection in each frame of the video using a Motion Estimate and Motion Compensation (MEMC) technology, to find fast movement frames or slow movement frames, according to the received video effect processing instruction, based on the speed of changes of the image content in each frame of the video. The terminal device can determine the fast movement frames as video frames that require slow motion video effect processing and the slow movement frames as video frames that require fast forward video effect processing.

In some embodiments, each video frame can be divided to a plurality of preset blocks. The terminal device can perform the movement amount detection, for example, through the MEMC technology, on the video according to the above video effect processing instruction to acquire a motion vector magnitude value for each of the preset blocks in each video frame. If the video effect processing instruction is the slow motion video effect processing instruction, the terminal device determines the number of fast blocks in each of the video frames, where a fast block refers to a preset block having a motion vector magnitude value greater than a motion vector threshold. For each video frame, the terminal device calculates a first ratio between the number of fast blocks and the total number of preset blocks in the video frame, and judges whether the first ratio is greater than a first preset ratio threshold. If the first ratio is greater than the first preset ratio threshold, which means the corresponding video frame involves fast movement, the terminal device determines that the corresponding video frame is a video frame that requires the slow motion video effect processing.

On the other hand, if the video effect processing instruction is the fast forward video effect processing instruction, the terminal device determines the number of slow blocks in each of the video frames, where a slow block refers to a preset block having a motion vector magnitude value smaller than the motion vector threshold. For each video frame, the terminal device calculates a second ratio between the number of slow blocks and the total number of preset blocks in the video frame, and judges whether the second ratio is greater than a second preset ratio threshold. If the second ratio is greater than the second preset ratio threshold, which means the corresponding video frame involves slow movement or a still or close-to-still image, the terminal device determines that the corresponding video frame is a video frame that requires the fast forward video effect processing. Hereinafter, a video frame that requires either the slow motion video effect processing or the fast forward video effect processing is also referred to as a "video frame to be processed."

At 203, the video effect processing is performed on the video frames to be processed according to the video effect processing instruction. If the video effect processing instruction is the slow motion video effect processing instruction, the terminal device performs a frame interpolation, such as an MEMC technology based frame interpolation, on the video frames to be processed according to a preset interpolation algorithm. The preset interpolation algorithm can include a multiple of the interpolation and a correspondence between the number of interpolating frames and a moving speed in the video frames to be processed.

On the other hand, if the video effect processing instruction is the fast forward video effect processing instruction, the terminal device performs a frame extraction, such as an MEMC technology based frame extraction, on the video frames to be processed according to a preset extraction algorithm. The preset extraction algorithm can include a ratio of the extraction and a correspondence between the number of extracted frames and the moving speed in the video frames to be processed.

Figure 4:
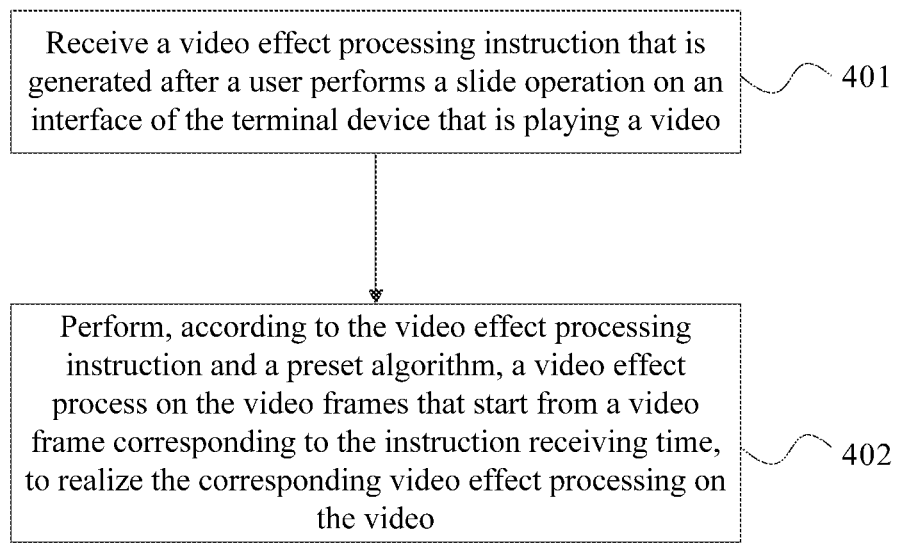
FIG. 4 is a flow chart showing a method for video effect processing according to another exemplary embodiment.
Figure 5:
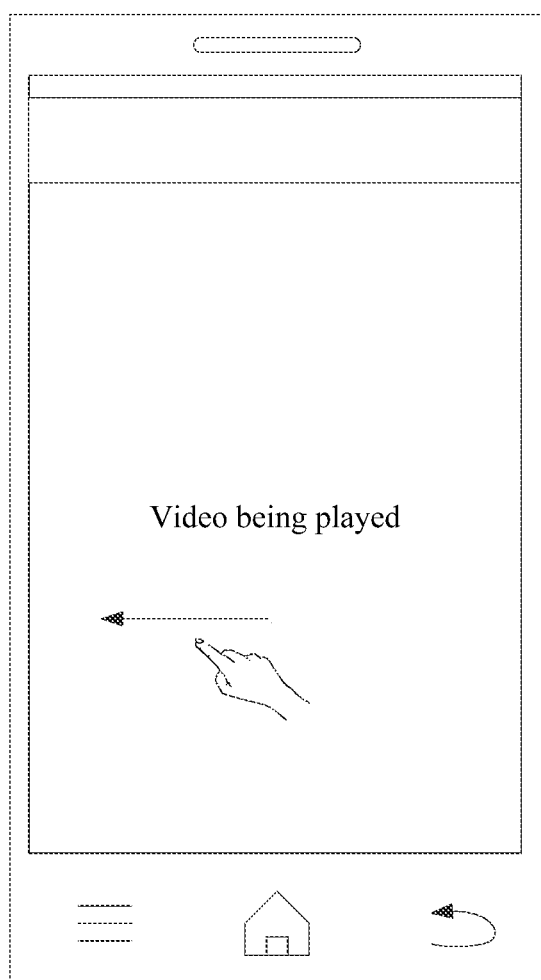
FIG. 5 is a schematic diagram showing a user performing a slide operation on an interface of a terminal device that is playing a video.

FIG. 4 is a flow chart showing a method for video effect processing according to another exemplary embodiment. As illustrated in FIG. 4, at 401, a video effect processing instruction is received. The video effect processing instruction is generated after a user performs a slide operation on an interface of the terminal device that is playing a video. The slide operation can include, for example, a left slide operation to generate a slow motion video effect processing instruction or a right slide operation to generate a fast forward video effect processing instruction. For example, FIG. 5 is a schematic diagram of the user performing the left slide operation on the interface with a finger during the playback of the video. Thus, if the slide operation is the left slide operation, a slow motion video effect may be added to the video. On the other hand, if the slide operation is the right slide operation, a fast forward video effect may be added to the video.

At 402, according to the video effect processing instruction and a preset algorithm, a video effect process is performed on video frames that start from a video frame corresponding to the time at which the video effect processing instruction is received, also referred to herein as "instruction receiving time," to realize the corresponding video effect processing on the video.

If the slide operation is the left slide operation, the terminal device starts to perform a frame interpolation on the video frames starting from the video frame corresponding to the instruction receiving time. Specifically, the terminal device processes these video frames according to a preset interpolation algorithm to realize the slow motion video effect in the video. On the other hand, if the slide operation is the right slide operation, the terminal device starts to perform a frame extraction on the video frames starting from the video frame corresponding to the instruction receiving time. Specifically, the terminal device processes these video frames according to a preset extraction algorithm to realize the fast forward video effect in the video.

Figure 6:
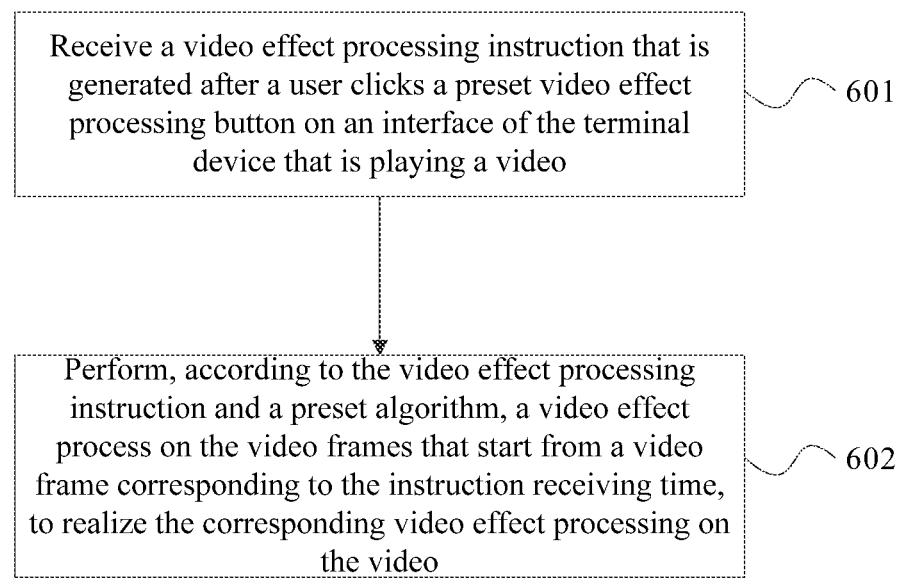
FIG. 6 is a flow chart showing a method for video effect processing according to another exemplary embodiment.

FIG. 6 is a flow chart showing a method for video effect processing according to another exemplary embodiment. As illustrated in FIG. 6, at 601, a video effect processing instruction is received. The video effect processing instruction is generated after a user clicks a preset video effect processing button on an interface of the terminal device that is playing a video, and the preset video effect processing button is configured to trigger the video effect processing on the video being played.

At 602, according to the video effect processing instruction and a preset algorithm, a video effect process is performed on the video frames that start from a video frame corresponding to the instruction receiving time, to realize the corresponding video effect processing on the video.

If the video effect processing button clicked by the user is a slow motion video effect processing button, the terminal device starts to perform a frame interpolation on the video frames starting from the video frame corresponding to the instruction receiving time. Specifically, the terminal device processes these video frames according to a preset interpolation algorithm to realize the slow motion video effect in the video. On the other hand, if the video effect processing button clicked by the user is a fast forward video effect processing button, the terminal device starts to perform a frame extraction on the video frames starting from the video frame corresponding to the instruction receiving time. Specifically, the terminal device processes these video frames according to a preset extraction algorithm to realize the fast forward video effect in the video.

In the exemplary methods described above in connection with FIGS. 2 and 3, the video effect processing instruction is received before the video is played. Thus, during the playback of the video, the terminal device automatically performs the movement amount detection to determine the video frames that need to be processed. On the other hand, in the exemplary methods described above in connection with FIGS. 4-6, the video effect processing instruction is received while the video is being played. In this scenario, the terminal device does not actively perform the movement amount detection on the video. Rather, the terminal device starts to perform the corresponding video effect processing on the video from the video frames corresponding to the instruction receiving time. That is, in this scenario, the terminal triggers the video effect processing according to an interactive operation of the user.

Figure 7:
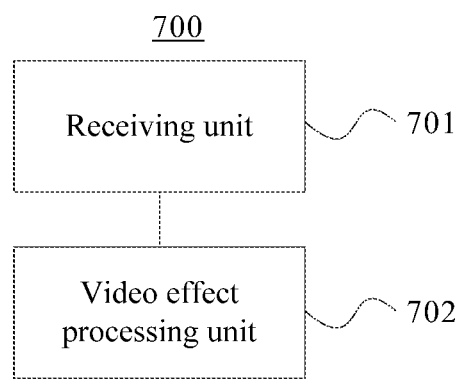
FIG. 7 is a block diagram illustrating a device for video effect processing according to an exemplary embodiment.

FIG. 7 is a block diagram illustrating a device 700 for video effect processing according to an exemplary embodiment. Referring to FIG. 7, the device 700 includes a receiving unit 701 and a video effect processing unit 702. The receiving unit 701 is configured to receive a video effect processing instruction. The video effect processing unit 702 is configured to perform a video effect processing, such as a slow motion video effect processing or a fast forward video effect processing, on a video according to the video effect processing instruction during the playback of the video.

In some embodiments, the receiving unit 701 is further configured to receive the video effect processing instruction that is generated after a user clicks a preset video effect processing button.

Figure 8:
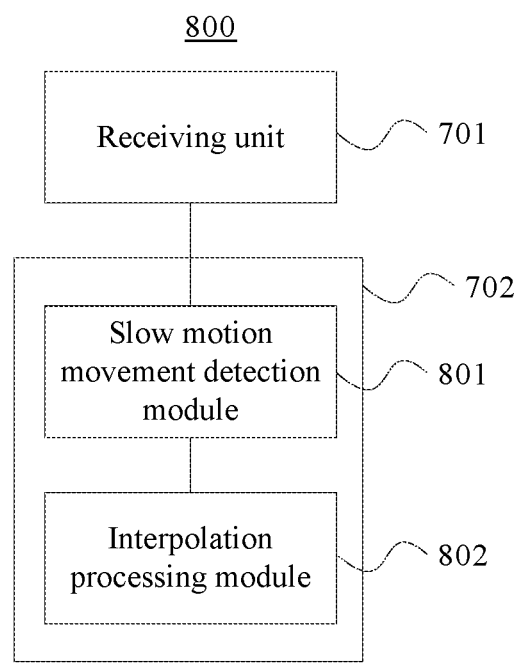
FIG. 8 is a block diagram illustrating a device for video effect processing according to another exemplary embodiment.

FIG. 8 is a block diagram illustrating a device 800 for video effect processing according to another exemplary embodiment. Referring to FIG. 8, the video effect processing unit 702 includes a slow motion movement detection module 801 and an interpolation processing module 802. The slow motion movement detection module 801 is configured to perform a movement amount detection on the video according to the video effect processing instruction and determine video frames that require the slow motion video effect processing in the video. The interpolation processing module 802 is configured to perform a frame interpolation process on these video frames according to a preset interpolation algorithm to realize the slow motion video effect processing on the video.

Figure 9:
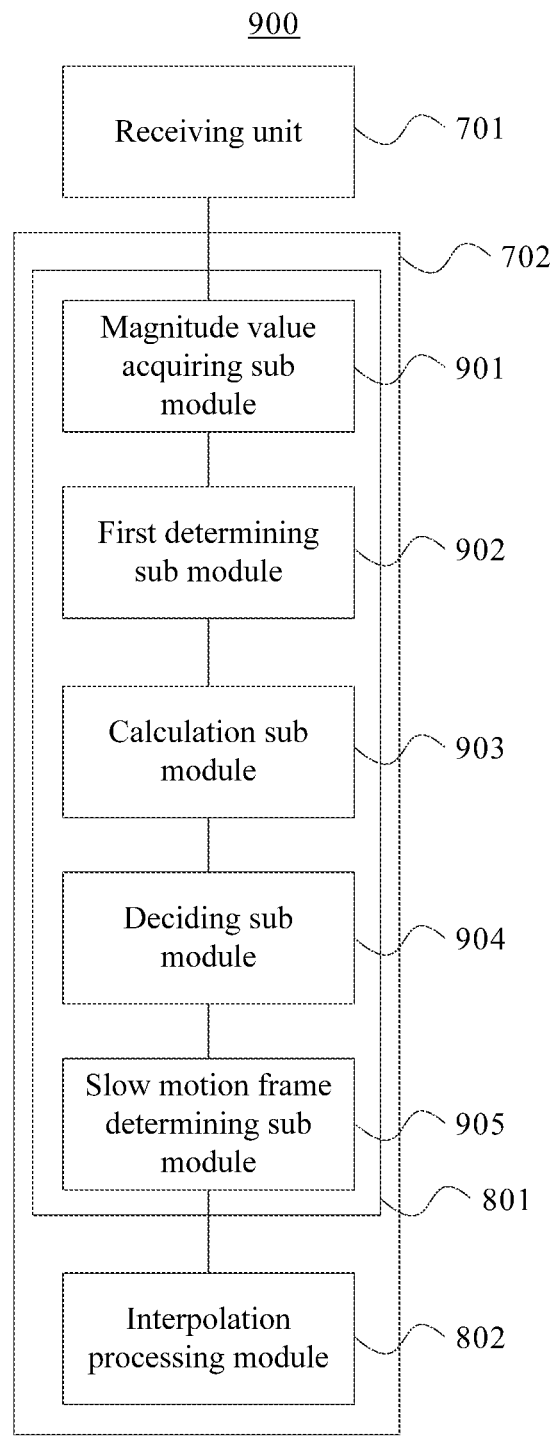
FIG. 9 is a block diagram illustrating a device for video effect processing according to another exemplary embodiment.

FIG. 9 is a block diagram illustrating a device 900 for video effect processing according to another exemplary embodiment. Referring to FIG. 9, the slow motion movement detection module 801 includes a magnitude value acquiring sub module 901, a first determining sub module 902, a calculation sub module 903, a deciding sub module 904, and a slow motion frame determining sub module 905. The magnitude value acquiring sub module 901 is configured to perform a movement amount detection on the video according to the video effect processing instruction and acquire motion vector magnitude values of all preset blocks in each video frame of the video. The first determining sub module 902 is configured to determine fast blocks in a video frame. The calculation sub module 903 is configured to calculate a first ratio between the number of fast blocks and the total number of preset blocks in the video frame. The deciding sub module 904 is configured to judge whether the first ratio is greater than a first preset ratio threshold. The slow motion frame determining sub module 905 is configured to determine that the video frame requires the slow motion video effect processing if the first ratio is greater than the first preset ratio threshold.

Figure 10:
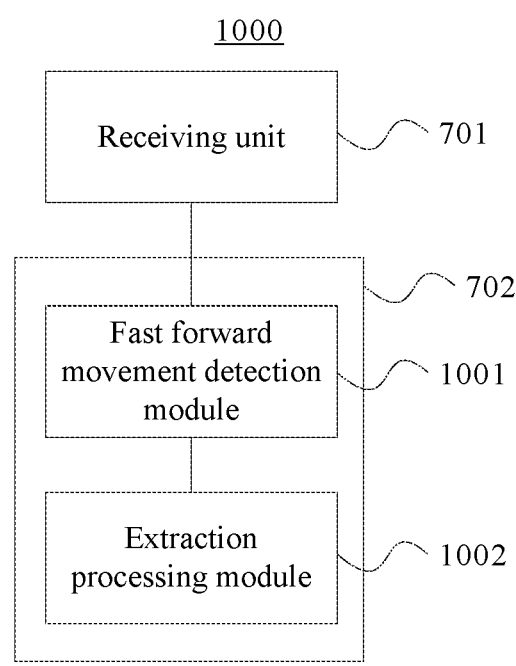
FIG. 10 is a block diagram illustrating a device for video effect processing according to another exemplary embodiment.

FIG. 10 is a block diagram illustrating a device 1000 for video effect processing according to another exemplary embodiment. Referring to FIG. 10, the video effect processing unit 702 includes a fast forward movement detection module 1001 and an extraction processing module 1002. The fast forward movement detection module 1001 is configured to perform a movement amount detection on the video that is to be processed according to the video effect processing instruction and determine, from the video, video frames that require the fast forward video effect processing. The extraction processing module 1002 is configured to perform a frame extraction process on these video frames according to a preset extraction algorithm to realize the fast forward video effect processing on the video.

Figure 11:
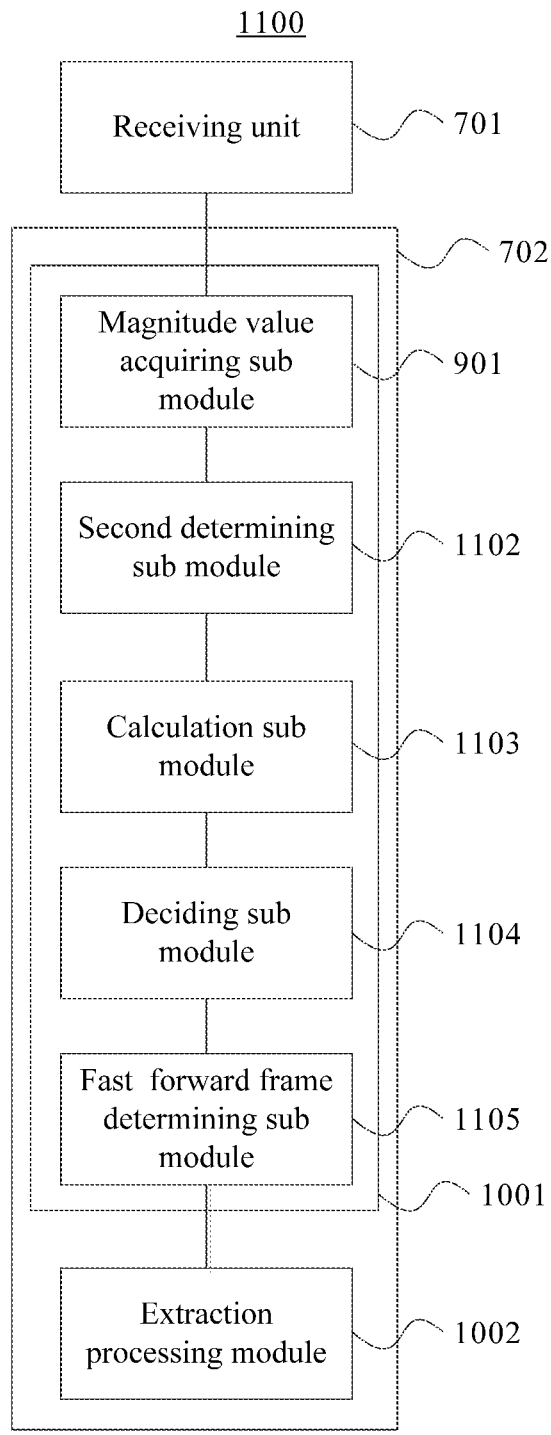
FIG. 11 is a block diagram illustrating a device for video effect processing according to another exemplary embodiment.

FIG. 11 is a block diagram illustrating a device 1100 for video effect processing according to another exemplary embodiment. Referring to FIG. 11, the fast forward movement detection module 1001 includes the magnitude value acquiring sub module 901, a second determining sub module 1102, a calculation sub module 1103, a deciding sub module 1104, and a fast forward frame determining sub module 1105. The second determining sub module 1102 is configured to determine slow blocks in a video frame. The calculation sub module 1103 is configured to calculate a second ratio between the number of fast blocks and the total number of preset blocks in the video frame. The deciding sub module 1104 is configured to judge whether the second ratio is greater than a second preset ratio threshold. The fast forward frame determining sub module 1105 is configured to determine that the video frame requires the fast forward video effect processing if the second ratio is greater than the second preset ratio threshold.

In some embodiments, the receiving unit 701 is further configured to receive the video effect processing instruction that is generated after the user performs a slide operation on an interface of the terminal that is playing a video.

If the slide operation includes a left slide operation indicating the slow motion video effect processing, the video effect processing unit 702 is further configured to perform, according to the video effect processing instruction and a preset interpolation algorithm, a frame interpolation process on the video frames that start from a video frame corresponding to the instruction receiving time, to realize the slow motion effect processing on the video.

On the other hand, if the slide operation includes a right slide operation indicating the fast forward effect processing, the video effect processing unit 702 is further configured to perform, according to the video effect processing instruction and a preset extraction algorithm, a frame extraction process on the video frames that start from a video frame corresponding to the instruction receiving time, to realize the fast forward effect processing on the video.

In some embodiments, the receiving unit 701 is further configured to receive the video effect processing instruction that is generated after the user clicks a preset video effect processing button on the interface of the terminal device that is playing the video.

If the preset video effect processing button is configured to trigger the slow motion video effect processing, the video effect processing unit 702 is further configured to perform, according to the video effect processing instruction and a preset interpolation algorithm, a frame interpolation process on the video frames that start from a video frame corresponding to the instruction receiving time, to realize the slow motion video effect processing on the video.

On the other hand, if the preset video effect processing button is configured to trigger the fast forward video effect processing, the video effect processing unit 702 is further configured to perform, according to the video effect processing instruction and a preset extraction algorithm, a frame extraction process on the video frames that start from a video frame corresponding to the instruction receiving time, to realize the fast forward video effect processing on the video.

Operations of individual modules in the above-described exemplary devices are similar to the exemplary methods described above, and thus their details are omitted here.

Figure 12:
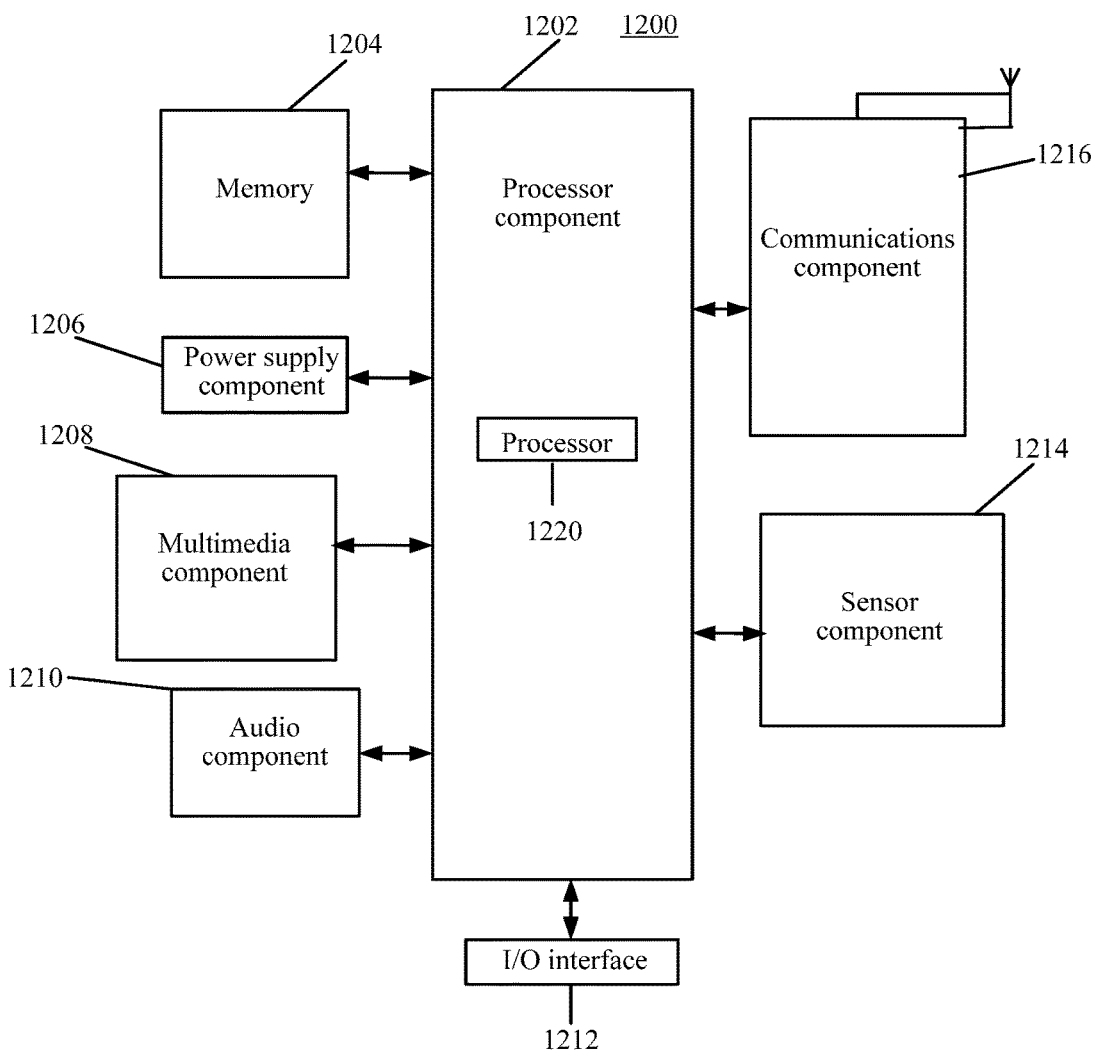
FIG. 12 is a block diagram illustrating a terminal device according to an exemplary embodiment.

FIG. 12 is a block diagram of a terminal device 1200 according to an exemplary embodiment. For example, the terminal device 1200 may be a smart phone, a computer, a tablet device, a PDA (Personal Digital Assistant), or the like.

Referring to FIG. 12, the terminal device 1200 includes one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the terminal device 1200, such as the operations associated with display, telephone calls, data communications, camera operations, and recording operations. The processing component 1202 may include one or more processors 1220 to execute instructions to perform all or part of a method consistent with the present disclosure, such as one of the above-described exemplary methods. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the terminal device 1200. Examples of such data include instructions for any applications or methods operated on the terminal device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the terminal device 1200. The power component 1206 may include a power management system, one or more power sources, and any other components associated with the generation, management, and distribution of power in the terminal device 1200.

The multimedia component 1208 includes a screen providing an output interface between the terminal device 1200 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the terminal device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone configured to receive an external audio signal when the terminal device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the terminal device 1200. For instance, the sensor component 1214 may detect an open/closed status of the terminal device 1200, relative positioning of components, e.g., the display and the keypad, of the terminal device 1200, a change in position of the terminal device 1200 or a component of the terminal device 1200, a presence or absence of user contact with the terminal device 1200, an orientation or an acceleration/deceleration of the terminal device 1200, and a change in temperature of the terminal device 1200. The sensor component 1214 may include a proximity sensor configured to detect the presence of nearby objects without any physical contact. The sensor component 1214 may also include a light sensor, such as a CMOS (Complementary Metal Oxide Semiconductor) or CCD (Charge-coupled Device) image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the terminal device 1200 and other devices. The terminal device 1200 can access a wireless network based on a communication standard, such as WiFi (WIreless-Fidelity), 2G, 3G, or 4G, or a combination thereof. In one exemplary embodiment, the communication component 816 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or other technologies.

In exemplary embodiments, the terminal device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is also provided a non-transitory computer-readable storage medium including instructions, such as included in the memory 1204, executable by the processor 1220 in the terminal device 1200, for performing a method consistent with the present disclosure, such as one of the above-described exemplary methods. For example, the non-transitory computer-readable storage medium may be a ROM, a RAM (Random Access Memory), a CD-ROM (Compact Disc Read-Only Memory), a magnetic tape, a floppy disc, an optical data storage device, or the like.

According to the present disclosure, a fast forward video effect processing or a slow motion video effect processing can be performed during playback of a video according to a video effect processing instruction. Thus, the video playback and the video effect processing can be performed simultaneously. As a result, the efficiency of the video effect processing is increased and a user's enjoyment of the video playback is improved.

Other embodiments of the invention will be apparent to those skilled in the art from consideration of the specification and practice of the present disclosure disclosed herein. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for video effect processing, comprising:
    receiving a video effect processing instruction associated with a video;
    performing a movement amount detection on each of a plurality of video frames of the video to determine target video frames that require the video effect processing; and
    performing the video effect processing on the target video frames during playback of the video,
    wherein when the video effect processing instruction includes a slow motion video effect processing instruction, performing the movement amount detection to determine the target video frames includes, for each of the plurality of video frames:
    acquiring motion vector magnitude values of all preset blocks in the video frame;
    determining a number of fast blocks in the video frame, a fast block being a preset block that has a motion vector magnitude value greater than a motion vector threshold;

calculating a first ratio between the number of fast blocks and a total number of preset blocks in the video frame;
determining whether the first ratio is greater than a first preset ratio threshold; and
determining, if the first ratio is greater than the first preset ratio threshold, the video frame to be a target video frame; and
wherein when the video effect processing instruction includes a fast forward video effect processing instruction that is configured to trigger the video to be played faster than a normal speed, performing the movement amount detection to determine the target video frames includes, for each of the plurality of video frames:
acquiring motion vector magnitude values of all preset blocks in the video frame;
determining a number of slow blocks in the video frame, a slow block being a preset block that has a motion vector magnitude value smaller than the motion vector threshold;
calculating a second ratio between the number of slow blocks and the total number of preset blocks in the video frame;
determining whether the second ratio is greater than a second preset ratio threshold; and
determining, if the second ratio is greater than the second preset ratio threshold, the video frame to be the target video frame.

2. The method according to claim 1, wherein receiving the video effect processing instruction includes:
receiving a video effect processing instruction generated by a user clicking a preset video effect processing button.

3. The method according to claim 2, wherein when the video effect processing instruction includes the slow motion video effect processing instruction, performing the video effect processing on the target video frames includes: performing a frame interpolation process on the target video frames according to a preset interpolation algorithm.

4. The method according to claim 2, wherein when the video effect processing instruction includes the fast forward video effect processing instruction, performing the video effect processing on the target video frames includes: performing a frame extraction process on the target video frames according to a preset extraction algorithm.

5. A terminal device, comprising:
a processor; and
a memory storing instructions that, when executed by the processor, cause the processor to:
receive a video effect processing instruction associated with a video;
perform a movement amount detection on each of a plurality of video frames of the video to determine target video frames that require the video effect processing; and
perform the video effect processing on the target video frames during playback of the video,
wherein when the video effect processing instruction includes a slow motion video effect processing instruction, the instructions further cause the processor to, for each of the plurality of video frames:
acquire motion vector magnitude values of all preset blocks in the video frame;
determine a number of fast blocks in the video frame, a fast block being a preset block that has a motion vector magnitude value greater than a motion vector threshold;
calculate a first ratio between the number of fast blocks and a total number of preset blocks in the video frame;
determine whether the first ratio is greater than a first preset ratio threshold; and
determine, if the first ratio is greater than the first preset ratio threshold, the video frame to be a target video frame; and
wherein when the video effect processing instruction includes a fast forward video effect processing instruction that is configured to trigger the video to be played faster than a normal speed, the instructions further cause the processor to, for each of the plurality of video frames:
acquire motion vector magnitude values of all preset blocks in the video frame;
determine a number of slow blocks in the video frame, a slow block being a preset block that has a motion vector magnitude value smaller than the motion vector threshold;
calculate a second ratio between the number of slow blocks and the total number of preset blocks in the video frame;
determine whether the second ratio is greater than a second preset ratio threshold; and
determine, if the second ratio is greater than the second preset ratio threshold, the video frame to be the target video frame.

6. The terminal device according to claim 5, wherein the instructions further cause the processor to:
receive a video effect processing instruction generated by a user clicking a preset video effect processing button.

7. The terminal device according to claim 6, wherein when the video effect processing instruction includes the slow motion video effect processing instruction, the instructions further cause the processor to: perform a frame interpolation process on the target video frames according to a preset interpolation algorithm.

8. The terminal device according to claim 6, wherein when the video effect processing instruction includes the fast forward video effect processing instruction, the instructions further cause the processor to: perform a frame extraction process on the target video frames according to a preset extraction algorithm.

9. A non-transitory computer-readable storage medium storing instructions that, when executed by a processor in a terminal, cause the terminal to:
receive a video effect processing instruction associated with a video;
perform a movement amount detection on each of a plurality of video frames of the video to determine target video frames that require the video effect processing; and
perform the video effect processing on the target video frames during playback of the video,
wherein when the video effect processing instruction includes a slow motion video effect processing instruction, the instructions further cause the terminal to, for each of the plurality of video frames:
acquire motion vector magnitude values of all preset blocks in the video frame;
determine a number of fast blocks in the video frame, a fast block being a preset block that has a motion vector magnitude value greater than a motion vector threshold;
calculate a first ratio between the number of fast blocks and a total number of preset blocks in the video frame;

determine whether the first ratio is greater than a first preset ratio threshold; and determine, if the first ratio is greater than the first preset ratio threshold, the video frame to be a target video frame; and wherein when the video effect processing instruction includes a fast forward video effect processing instruction that is configured to trigger the video to be played faster than a normal speed, the instructions further cause the processor to, for each of the plurality of video frames:

acquire motion vector magnitude values of all preset blocks in the video frame;

determine a number of slow blocks in the video frame, a slow block being a preset block that has a motion vector magnitude value smaller than the motion vector threshold;

calculate a second ratio between the number of slow blocks and the total number of preset blocks in the video frame;

determine whether the second ratio is greater than a second preset ratio threshold; and determine, if the second ratio is greater than the second preset ratio threshold, the video frame to be the target video frame.

* * * * *